Feb. 6, 1934.      A. Y. DODGE      1,946,063
LUBRICATION DEVICE
Filed Feb. 8, 1932
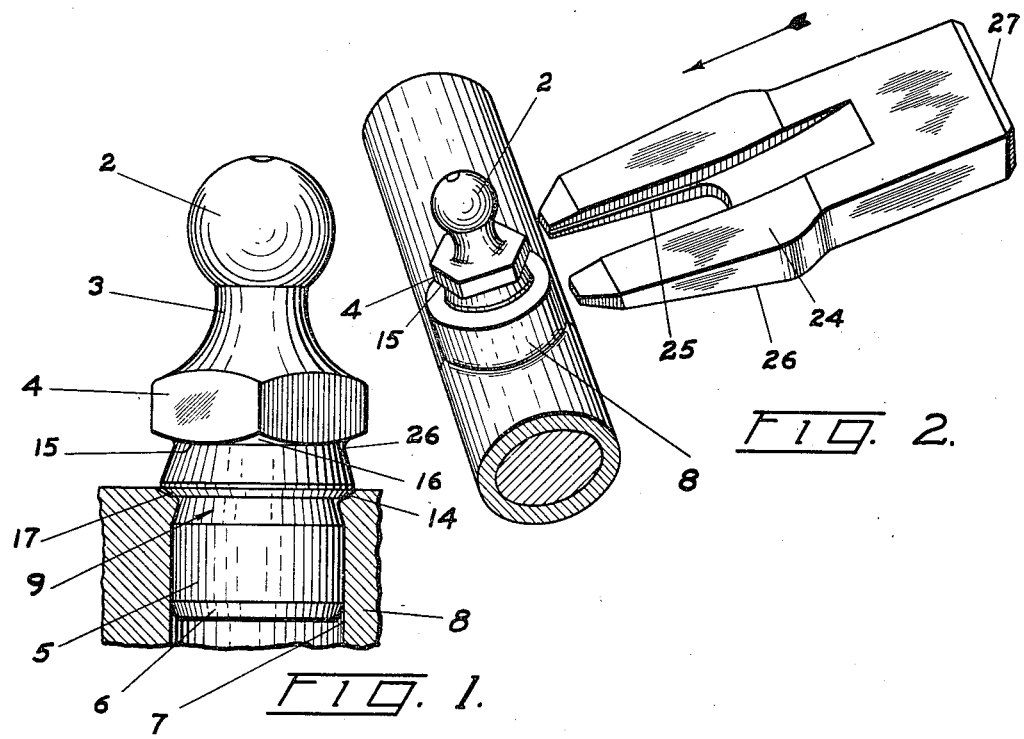
Fig. 1.
Fig. 2.
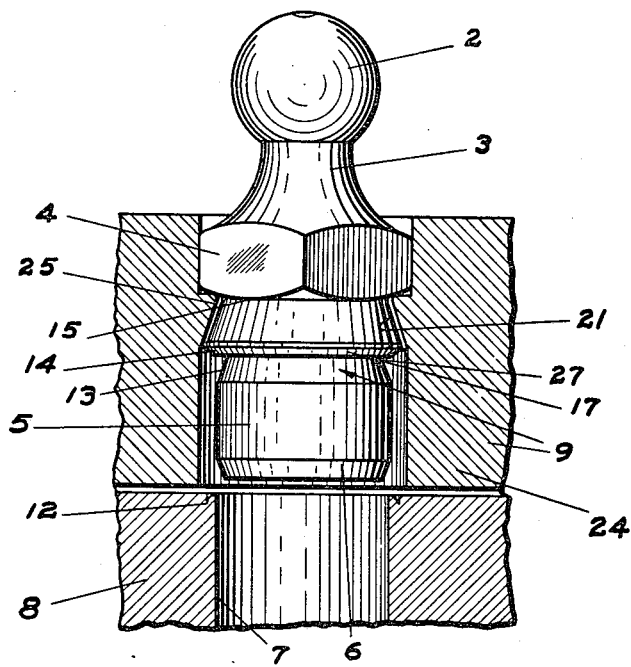
Fig. 3.
INVENTOR.
ADIEL Y. DODGE
BY
ATTORNEY.

Patented Feb. 6, 1934

1,946,063

UNITED STATES PATENT OFFICE 1,946,063

LUBRICATION DEVICE

Adiel Y. Dodge, South Bend, Ind., assignor to The Lubrication Corporation, South Bend, Ind., a corporation of Delaware Application February 8, 1932. Serial No. 591,536

5 Claims. (Cl. 285—25)

This invention relates to lubrication devices, and more particularly to drive type lubrication fittings of the character shown and described in my co-pending application Serial #563,419, filed September 17th, 1931, although certain of its features may be readily applied to drive rivets and other devices which are secured to another member by interlocking engagement after the manner in which the lubrication fitting is secured.

One of the objects of the present invention is to provide a lubrication fitting capable of being easily inserted and secured in and easily withdrawn from a recess or bore in a bearing member or the like.

Another object is to provide a lubrication device wherein a sub-portion of the bearing or other member into which it is driven is displaced during the driving process for locking the fitting in operative position and in which means is provided for facilitating and guiding the initial displacement of the aforesaid sub-portion.

Another object is to provide a lubrication device so constructed as to enable the application of withdrawal forces substantially along the axis of the fitting.

Other objects and advantages and uses of the invention will become apparent after reading the following specification and claims and viewing the accompanying drawing forming a part of this application, in which:

Fig. 1 is a part sectional elevation of the lubrication fitting inserted in a drilled recess in a bearing member;

Fig. 2 is a perspective view of the lubricating fitting after installation, illustrating the withdrawal tool in an operative position, and Fig. 3 is a part sectional elevation of the fitting as it appears between the jaws of the withdrawing tool just after withdrawal from the bearing member.

A drive fitting or nipple for lubrication purposes similar to the purposes of the fitting of the aforesaid copending application has been chosen for illustration of the invention, but it should be understood that its novel features may be incorporated in rivets and other devices that may be secured by a force fit or by interlocking engagement with a receiving member.

Referring to the drawing, the fitting is provided with a ball head 2, a neck portion 3, a wrench receiving portion 4, of hexagonal shape, and a shank portion 5. These parts, in this embodiment, are integral although they might be made separately and joined together in any suitable manner.

The shank portion 5 may have its free end tapered off as shown at 6 so that the fitting may be more easily started into the recess in the device or member into which the fitting is to be secured; in the present instance, into a cylindrical passage 7, drilled or otherwise formed in the body or housing 8 of a bearing. A shoulder 14, of slightly greater diameter than the diameter of the recess 7 into which the shank is received, is partially defined by a circumferential depression 9 cut in the shank and serves to upset or flow the metal of the bearing housing 8 into the depression whereby to lock the fitting in place.

In order to facilitate the initial upset or flow of the bearing housing 8 into the depression, the outer portion of the shoulder 14 is chamfered at an angle of 30° as shown at 17.

The shank side of the depression 9 is tapered as indicated at 13 in order to assist in the removal of the fitting, should its removal be desired, by wedging back toward its initial position that metal which was displaced into the depression 9 when the fitting was driven into the receiving member 8. The effect of this tapered side 13 is roughly indicated at 12 in Fig. 3. A further and important utility of the tapered side 13 of the annular depression 9, where the fitting is used as a lubrication device or for the conduction and confinement of any fluid under pressure tending to expel the fitting, is that such pressure when applied causes the tapered side of the shank to seat closely upon the upset metal of the receiving member to form a highly effective fluid-tight seal.

Ordinarily the fitting might easily be withdrawn from the bearing by engaging a claw tool under the ball head 2 but in those cases where the fitting heads are broken or cracked and when it might damage the head so to remove the fitting this method is impractical. In order to overcome this difficulty the fitting is provided with a second shoulder 15, above the drive shoulder 14, against which a tool may be engaged.

In Figure 2, one form of tool suitable for the purpose is shown about to be engaged beneath the shoulder 15 to effect withdrawal of the fitting and in Figure 3 the relative positions of the bearing housing, the fitting and the tool, just after the fitting has been "lifted", have been depicted.

It will be observed that the hexagonal or wrench receiving portion 14 receives the full effect of the force applied through the tool during the "lifting" or withdrawing and for that reason it is necessary to give the portion 4 considerable strength. Preferably, this portion is made comparatively thick (the drawing has been made as nearly proportional as possible for comparative purposes) in the direction of the axis of the fitting and is also of slightly greater diameter, perpendicular to a facet, than the diameter of the drive shoulder 14. In order to insure engagement of the tool with the lifting shoulder 15 over the largest possible area of the latter, the corners formed by the juncture of two facets and the shoulder are rounded as shown at 16. Of course it is not necessary to provide wrench engaging facets for the portion 4 may be cylindrical or any other shape, but it has been found helpful in some instances first to turn the fitting with a wrench before attempting to remove it.

The tool 24 has a forked end similar to the claw of a claw hammer and each prong of the claw is stepped as shown at 25 to provide a shoulder adapted to engage beneath the shoulder 15. The perpendicular distance between the top of each step 25 and the bottom or fulcrum side of the tool increases from the ends of the prongs to their juncture with the tool body so that the tool may be driven as a wedge beneath the fitting gradually lifting the latter from the recess.

It has been found preferable, in order to obtain the greatest strength and the highest safety factor, to fillet the corners 26 and 27 respectively between the shoulders 14 and 15 and the body of the fitting; also to taper the surface 21.

In assembling the fitting in the passage or bore 7 of the bearing member 8, the fitting is first aligned with the bore so that the tapered end 6 of the shank registers with the mouth of the recess. A tubular drive tool of the type illustrated in my aforesaid co-pending application is applied to the fitting by placement over the ball head 2 and neck 3 so that its driving edge contacts with the upper surface of the wrench engaging portion 4 of the fitting and a blow or series of blows is applied to the tool to drive the fitting downwardly into the recess. As the chamfered body 14 engages with the metal of the bearing encompassing its fitting receiving orifice, sub-portions of the metal are thus, through impact, caused to flow in the direction of least resistance being that region about the annular depression 9. Continued driving force applied to the fitting result in a tight and mechanically strong interlock between the fitting and the bearing as clearly shown in Fig. 1.

The fitting when thus installed upon the bearing member or other fitting receiving device presents easy access of the jaws of the fitting withdrawal tool 24 to the shoulder 15 for purposes of withdrawal or replacement.

The tool 24 is held in substantially the position shown in Fig. 2 and moved so that the steps 25 on the opposed inner walls of the claws engage with opposite sides of the shoulder 15 of the fitting and the lower surface 26 of the tool is permitted to rest directly upon the upper surface of the bearing or fitting receiving member 8. A blow or series of blows applied to the remote end 27 of the withdrawal tool in a direction perpendicular to the axis of the fitting produces the necessary low pitch wedging force to slowly lift the fitting along its longitudinal axis from engagement with the recess 7. In doing so the inclined side of the annular depression 7 causes that sub-portion of the bearing material about the mouth of the recess to resume in part its position prior to the initial introduction of the drive fitting.

It is to be understood that the above embodiment of the invention is for the purpose of illustration only and various changes may be made herein without departing from the scope of the claims:

I claim:
1. A lubrication drive fitting adapted to be driven into a bore in a receiving member, said fitting having a shank formed with an annular depression at the upper portion thereof and an annular groove in that portion of the fitting above said depression, one wall of said groove defining a substantially perpendicular shoulder facing in the direction of the depression for engagement by a fitting withdrawal tool.

2. A lubrication drive fitting having a shank for interlocking with a receiving member when driven therein, said fitting having a portion formed to provide downwardly facing shoulders at opposing sides of the fitting above the shank for engagement with a withdrawal tool, said shoulders extending outward of and beyond the side walls of said shank and transversely of the axis of the shank.

3. A lubrication drive fitting adapted to be secured in a recess in a member such as a metal bearing and having a shank provided with a depression, means forming an integral part of said fitting for displacing metal of the member adjacent to the recess into which said fitting is driven into said depression, and a groove surrounding said fitting above said metal displacing means, one side of said groove being defined by a shoulder that is substantially perpendicular to the axis of the fitting, said shoulder facing downwardly.

4. A drive type lubrication fitting comprising, a body having a head portion for engagement with a lubricant nozzle, a shank portion to be secured in a receiving member such as a bearing, and an intermediate portion between the head and shank portions, said shank portion terminating in a substantially cylindrical part with substantially smooth exterior walls, said cylindrical part being adapted to be received wholly within a bore in the receiving member, said shank portion also having a circumferential swaging shoulder of greater diameter than said cylindrical part disposed adjacent to said intermediate portion and a recess between said shoulder and cylindrical part for reception of material swaged from said receiving member by said swaging shoulder, said intermediate portion having a part adapted to be engaged by a wrench, and a lifting tool engaging part between said wrench engaging part and said shoulder on said shank portion.

5. A drive type lubrication fitting comprising, a body having a head portion for connection with a lubricant delivery nozzle, a shank portion to be secured in a bore in a receiving member such as a bearing, and an intermediate portion between the head and shank portions; said shank portion terminating in a substantially cylindrical part adapted to be received wholly within the bore in the receiving member, said shank having a circumferentially extending swaging shoulder extending radially outward beyond the outer wall of said cylindrical part between said cylindrical part and said intermediate portion, said shank also having a circumferentially extending recess between said shoulder and said cylindrical part for reception of material swaged from said receiving member by said swaging shoulder; said intermediate portion having a downwardly facing shoulder formed thereon for engagement by a lifting device.

ADIEL Y. DODGE.